United States Patent [19]

Tsoi

[11] Patent Number: 5,633,912
[45] Date of Patent: May 27, 1997

[54] MOBILE TELEPHONE USER INTERFACE INCLUDING FIXED AND DYNAMIC FUNCTION KEYS AND METHOD OF USING SAME

[75] Inventor: Kam-Cheong A. Tsoi, Westminster, Colo.

[73] Assignee: U S West Advanced Technologies, Inc., Boulder, Colo.

[21] Appl. No.: 664,876

[22] Filed: Jun. 17, 1996

Related U.S. Application Data

[63] Continuation of Ser. No. 460,782, Jun. 5, 1995, abandoned, which is a continuation of Ser. No. 89,146, Jul. 8, 1993, Pat. No. 5,425,077.

[51] Int. Cl.$^6$ ..................................................... H04Q 7/32
[52] U.S. Cl. .............................. 379/58; 455/90; D14/138; D14/247
[58] Field of Search ................................. 379/58, 59, 61, 379/368, 21, 96, 433, 355, 388, 201, 354; 455/89, 90; 345/173; D14/137, 138, 140, 142, 147, 247

[56] References Cited

U.S. PATENT DOCUMENTS

| 4,425,627 | 1/1984 | Eibner | 379/201 |
|---|---|---|---|
| 4,788,720 | 11/1988 | Brennan et al. | 379/96 |

OTHER PUBLICATIONS

Advertisement, "Terminal System 24" Harris Corporation in Telephony, pp. 24–25, Sep. 19, 1988.

*Primary Examiner*—Curtis Kuntz
*Assistant Examiner*—Michael B. Chernoff
*Attorney, Agent, or Firm*—Peter J. Kinsella

[57] ABSTRACT

A user interface for use in a mobile telephone handset which includes static visual display means for presenting the status of the mobile telephone and other services accessible by the user. The interface further includes dynamic visual display means for presenting a plurality of context sensitive function labels. A plurality of fixed-labels signaling keys and soft-label signaling keys are also provided in electrical communication with the static and dynamic visual display means. The soft-label signaling keys are operative to access the displayed function labels relevant to the current context of the user interface. A method is further disclosed which includes the provision of a mobile telephone handset as described above, as well as the steps of viewing the static and visual displays to obtain instructions as to the status of the mobile telephone, the availability of telephone functions and whether fixed or soft-label signaling keys should be utilized. As a further step, selected telephone function labels are presented on the static and dynamic visual displays and selected functions are accessed.

14 Claims, 7 Drawing Sheets

Providing a mobile telephone handset having an earpiece, a mouthpiece and a user interface which includes a static visual display, a dynamic visual display, a plurality of fixed-label signalling keys, a plurality of soft-label signalling keys and indicator means. — 60

Viewing the static and dynamic visual displays to obtain instructions as to the status of the mobile telephone, the availability of telephone functions and whether fixed or soft-label signalling keys should be utilized. — 62

Accessing selected telephone functions whose labels are presented on the static and dynamic visual displays. — 64

MOBILE TELEPHONE USER INTERFACE INCLUDING FIXED AND DYNAMIC FUNCTION KEYS AND METHOD OF USING SAME

This application is a continuation of application Ser. No. 08/460,782, filed Jun. 5, 1995, now abandoned, which is a continuation of application Ser. No. 08/089,145, filed on Jul. 8, 1991, now U.S. Pat. No. 5,425,077.

TECHNICAL FIELD

This invention relates generally to mobile communications and, more particularly, to a mobile telephone handset having an improved user interface and method of using the same.

BACKGROUND ART

With the introduction of cellular telephone networks, the mobile telecommunications industry has exploded in the last ten years. As a result, neither range nor economic considerations presently raise substantial barriers to mobile telephone use. By conservative estimate, there are now sixteen million cellular telephone subscribers in more than eighty countries. These subscribers represent but a fraction of the potential mobile telephone market. In fact, the number is expected to increase threefold to fifty-three million by 1996.

While the United States currently accounts for almost fifty percent of the world's cellular subscribers (Europe accounts for approximately twenty eight percent) it is believed that by 1996, thirty-five percent of the world's subscribers will be using a digital system.

Analog cellular networks will continue to provide competition as will wireless (cordless) telephones. The latter is expected to exceed fifty-eight million users by the year 2000. Telepoint applications have similarly been adopted around the world and cordless voice and data transmissions have become a reality with the development of the Wireless Private Branch Exchange (WPBX) and cordless local area networks (CLANs).

Against this background, communications engineers have now turned their attention toward the design, development and implementation of user-friendly and ergonomically disposed mobile telephones. For example, see U.S. Pat. Nos. 4,706,273 and 4,870,676, issued to Spear et al and Lewo, respectively, which are directed to vehicle sun visor telephones. See also, U.S. Pat. No. 4,905,270 which is directed to a vehicular hands-free telephone system.

As those skilled in the art will recognize, conventional mobile telephones generally present all information entry keys for all telephone functions. Such keys are adapted for use in cooperation with a single visual display—regardless of whether the functions are relevant in the current context of the communication. Moreover, such visual displays do not present sufficient information to prevent users from entering an irrelevant or improper key. As a result, an erroneous key selection results in either an error message or similar indication that an invalid key has been entered—neither of which is desirable from a user standpoint. To implement additional functions, conventional mobile telephones have incorporated additional keys which again correspond to functions which are neither relevant nor operable in all contexts. As a result, the size as well as the complexity of such handsets has been correspondingly increased.

In an effort to minimize the number of entry keys while increasing the number available features, mobile telephone designers have thus incorporated entry keys which may be used to initiate multiple functions. In some applications, <shift> keys have also been utilized. These multi-function entry keys have been designed to provide specific functions which are tied to particular communication contexts. This correspondence, however, is neither readily apparent nor logically referenced. For example, many cellular telephones utilize an entry key labeled <send> for use in both answering an incoming call as well as to originate an outgoing call. Similarly, many vehicular cellular phones utilize a <control> entry key which may be used to store selected telephone numbers, lock the handset, control the volume of the received communication and perform other selected operations. The syntax of these operations is also neither apparent nor consistent. For example, in conventional mobile telephones, storing a telephone number generally requires a three-step process, i.e., initiation of a store sequence, identification of a telephone number sought to be stored, and selection of a storage location. These steps and their sequence vary widely from manufacturer to manufacturer and from handset to handset. Most importantly, however, little if any on-line help—other than an error message—is provided to guide the user through the required syntax.

Applicants are aware of existing mobile and desk top telephones presently marketed which utilize three or more classes of signaling keys or "buttons" in combination with a single visual display. See, for example, Finnish Nokia 101 portable telephone which includes a first class of dual tone multi frequency (DTMF) keys, a second class of action keys, i.e., <SEND> and <END> and a third class of function keys, i.e., <POWER>, <CLR>, <RCL>, <ALPHA>, <MENU> and <STO>. Also included in this third class of keys is a browse button <↑↓> for menu scanning. Similarly, Isotec Desktop Telephone Model No. 228 includes a first class of DTMF buttons, a second class of function buttons, i.e., <TR/CON>, <HOLD>, <HF>, <VOL↑> and <VOL↓>, etc. and a third class of specific soft-label buttons for use in initiating modem connections.

DISCLOSURE OF THE INVENTION

It is an object of the present invention to overcome the limitations of the prior art by providing a user interface for use in a mobile telephone handset which eliminates the complexity and ambiguity problems encountered in conventional mobile telephone handsets, yet provides a plurality of user-friendly functions.

A more specific object of the present invention is the provision of a user interface for use in a mobile telephone handset which incorporates only two classes of entry keys for use in cooperation with corresponding static and dynamic visual displays. Specifically, a plurality of fixed and soft-label signaling keys are provided which are operative to access displayed function labels relevant to the current context of the user interface.

Yet another object of the present invention is the provision of a method of interfacing a mobile party to a secondary party through the use of a user-friendly telephone handset.

Still further, another more specific object of the present invention is the provision of a method of interfacing a mobile party to a secondary party through the use of a mobile telephone handset having an earpiece, a mouth piece, and a user interface which includes a static visual display, a dynamic visual display, a plurality of fixed-label signaling keys, a plurality of soft-label signaling keys and prompting means.

In carrying out the above objects, there is provided a user interface for use in a mobile telephone handset which comprises static visual display means for indicating the status of the mobile telephone and other services accessible by the user. There is further provided dynamic visual display means for presenting a plurality of context sensitive function labels. The user interface further includes a plurality of both fixed and soft-label signaling keys in electrical communication with the static and dynamic visual display means. As disclosed herein, the soft-label keys are operative to access display function labels relevant to the current context of the user interface.

In a preferred embodiment, the user interface further includes prompting means in electrical communication with the dynamic visual display means for indicating to the user whether the fixed-label or soft-label keys should be used. The user interface further includes indicator means in electrical communication with the status visual display means for indicating the status of the communication.

In keeping with the invention, the method steps disclosed herein include the provision of a mobile telephone handset having an earpiece, a mouthpiece and a user interface which includes a static visual display, a dynamic visual display, a plurality of fixed-label signaling keys, a plurality of soft-label signaling keys and prompting means. In operation, the visual displays are viewed to obtain instructions as to the status of the mobile telephone, the availability of telephone functions and whether fixed or soft-labeled keys should be used. The method steps further include accessing selected telephone functions whose labels are presented on the static and dynamic visual displays.

The above objects and other objects, features, and advantages of the present invention are readily apparent from the following detailed description of the best modes for carrying out the invention when taken in connection with the accompanying drawings.

BEST MODES FOR CARRYING OUT THE INVENTION

As those skilled in the art will recognize, the main forms of mobile communications presently available are paging, cellular telephony, cordless telephony, private mobile radio, data over cellular and public access mobile data. Currently, the highest volume use is concentrated on cellular radio telephone which permits users to make or receive calls in different locations of their choice within a defined network coverage area, whether the user is stationary or mobile.

Figure 1:
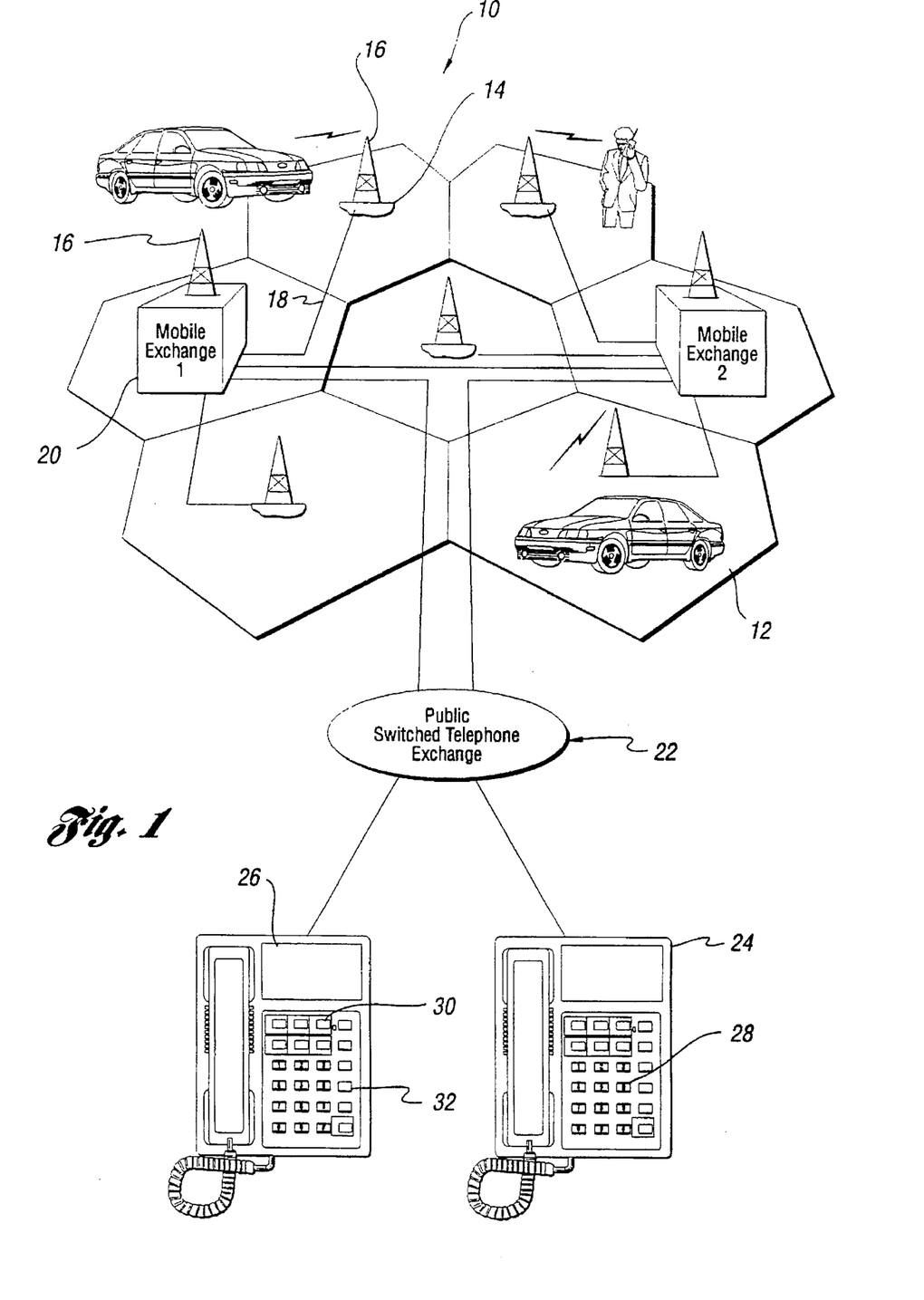
FIG. 1 is a schematic diagram of a representative cellular telephone network.

With reference to FIG. 1 of the drawings, a conventional cellular telephone network is shown and designated generally by reference numeral 10. As seen, cellular radio systems divide regions into a number of areas or "cells" 12 each of which includes a base station 14 with radio transmitters/receivers (transceivers) 16. Each cell is allocated a selected number of radio channels and is designed such that the next nearest cell (not adjacent cells) can re-use the same set of channels. Cell size and cell channel allocation are determined by the number of users typically in an area.

Still referring to FIG. 1, it is seen that in conventional cellular networks, base stations 14 are connected by fixed links 18 to dedicated telephone exchanges 20, termed Mobile Switching Centers (MSCs). These Mobile Switching Centers maintain records of the locations of handsets, route calls between mobile phones and the National Fixed Telephone Network (NFTN), carry out call accounting and manage roaming between cells. As shown, mobile switching centers 20 are similarly connected by fixed links 18 to the Public Switched Telephone Network (PSTN) designated generally by reference numeral 22. These cellular telephone networks permit calls to and from both domestic and international telephones which are generally designated by reference numeral 24. As referenced above, conventional telephones 24 may include a visual display means 26 known to those skilled in the art to provide limited call information, i.e., name, internal exchange, telephone number, date, time, in conjunction with three or more classes of entry keys. For example, telephone 24 contains a first class of Dual Tone Multi-Frequency (DTMF) keys 28; a second class of action keys 30, i.e. <HOLD>, <HF>, <TR/CONF>, etc. and a third class of soft-label buttons 32 for performing selected functions. For example, in many office environments, keys 32 may be used to select a "port" and "baud rate" for connecting a modem. As referenced above, the syntax of these functions, however, is generally not readily apparent to the user and may be accessed at any time even if not relevant to the current context of the communication. In such case, an error message or invalid key indication may be provided.

There are three types of cellular phones. The mobile or car phone, the transportable, and the hand portable. As those skilled in the art will recognize, the mobile phone fits into a user's vehicle and receives its power supply directly from the vehicle battery. In contrast, the transportable phone is designed as an integral unit with a detachable battery pack generally designed for use outside of a vehicle. The hand portable is very similar to the transportable, yet it is generally smaller and is battery powered.

In addition to cellular radio telephony, numerous subscribers currently use cordless telephony which permits calls to be made and received from a portable handset linked by radio signals to a fixed base station. As in cellular radio telephone, the fixed base station is connected to the Public Switched Telephone Network (PSTN) or a Private Branch Exchange, specifically, Wireless Private Branch Exchanges (WPBX).

In addition, there is currently in use PCN systems which utilize a two-way digital cellular network which operates high frequencies and uses advanced digital technology. By design, these systems have the capacity to simultaneously transmit tens of thousands of calls. As those skilled in the art will recognize, PCN systems are contrasted from conventional cellular networks in that PCN networks are designed to support low-power hand-held terminals.

Figures 2, 3:
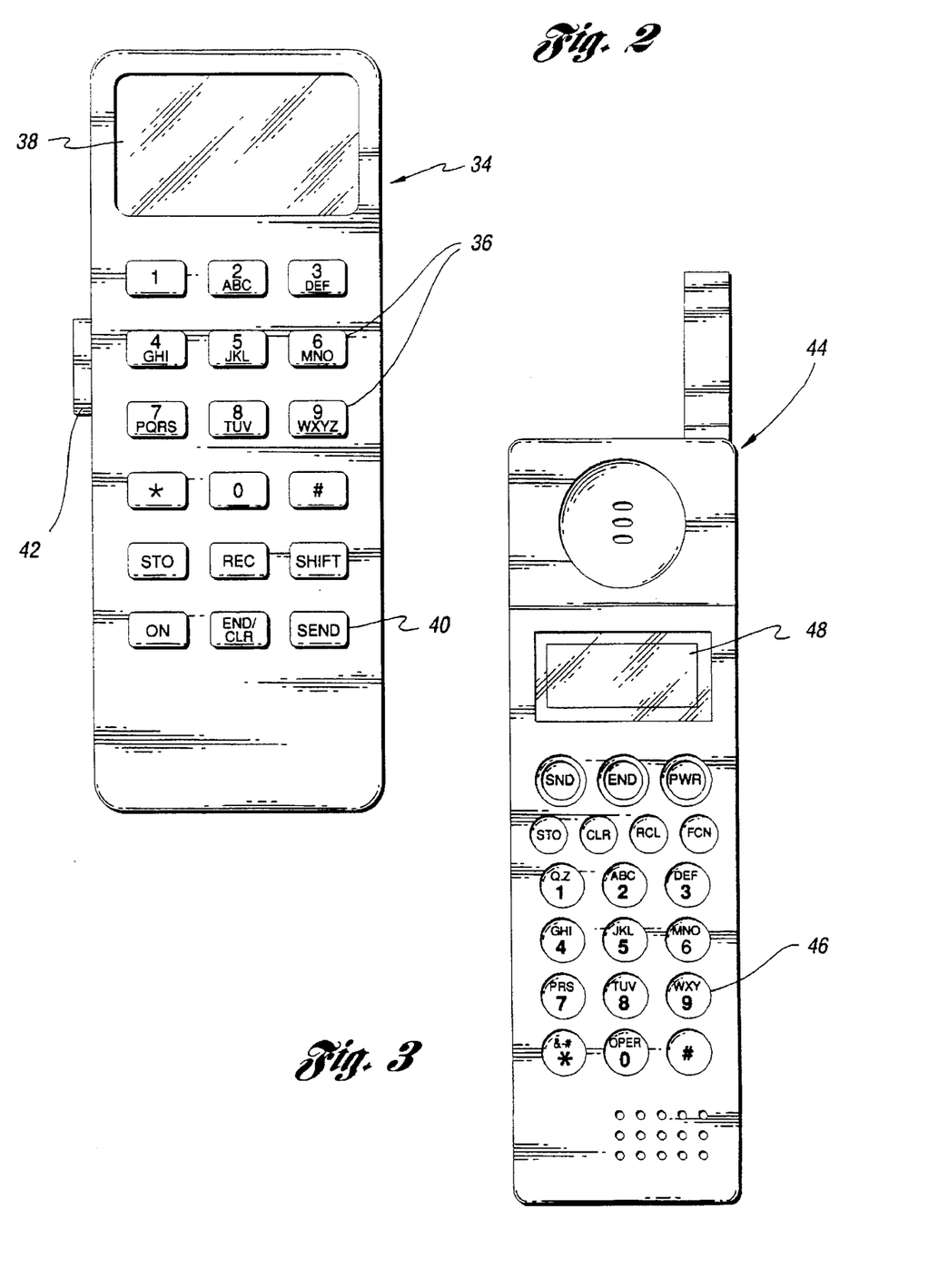
FIG. 2 is a front plan view of a prior art vehicular mobile telephone handset.
FIGS. 3–4 are front plan views of respective prior art portable cellular telephones.

With reference now to new FIG. 2 of the drawings, there is provided a schematic diagram of a representative vehicular mobile telephone handset designated generally by reference numeral 34. As shown, vehicle handset 34 includes a first class of fixed-label entry keys 36 disposed on the keypad for generating Dual Tone Multi-Frequency (DTMF) signals (i.e. digits 0–9 plus the * and #). Handset 34 further includes a single visual display 38 which, as referenced above, does not present detailed information sufficient to advise users from entering an irrelevant or incorrect key. Finally, handset 34 includes a second class of fixed label action keys, i.e., <STO>, <REC>, <SEND>, etc., for initiating selected functions. As referenced above, the <SEND> key is ambiguously operative for answering both incoming calls and for originating an outgoing call. A <control> key 42 operative to initiate a plurality of other functions such as locking the handset, increasing the volume, storing a desired telephone number and performing other selected operations is also provided. As indicated above, vehicular mobile telephone handsets of the type referenced in FIG. 2 provide ambiguous and imprecise functionality, are complicated to use and, as a result, are highly prone to user error.

Turning now to FIG. 3 of the drawings, a representative prior art hand portable mobile telephone is shown and designated generally by reference numeral 44. Portable phone 44 is known to those skilled in the art as the NEC Model T300 portable phone. Like the prior art vehicular mobile phone of FIG. 2, portable phone 44 includes a first class of fixed-label entry keys 46 for generating DTMF signals. Handset 44 further includes a second class of fixed-label action keys, i.e., <SEND>, <STO>, <RCL>, <FCN>, <CLR>, <END> and <PWR> for initiating selected functions. Significantly, each of the fixed-label entry keys 44 and 46 are tied to a single visual display 48.

Figures 4, 5:
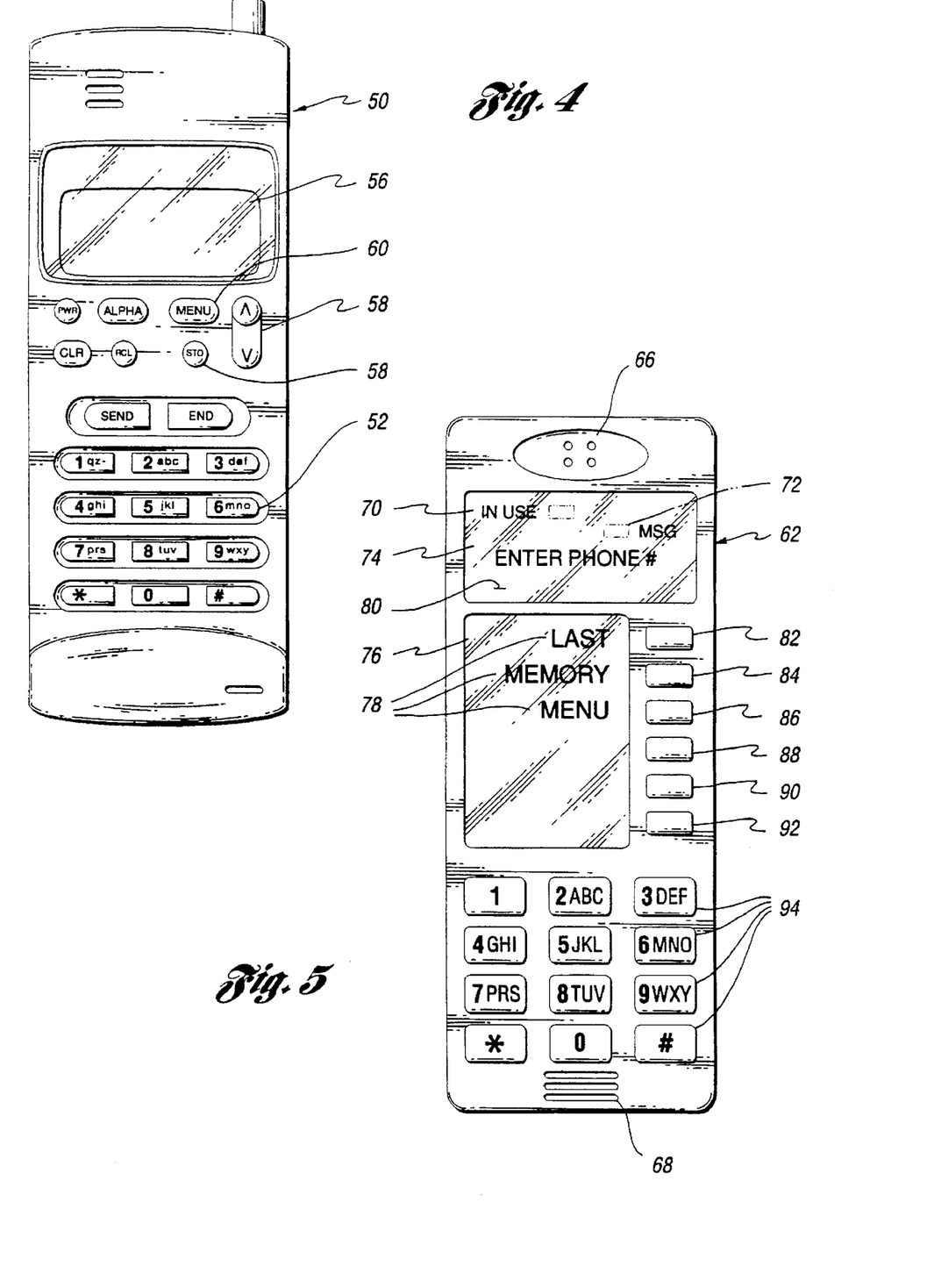
Figure 6:
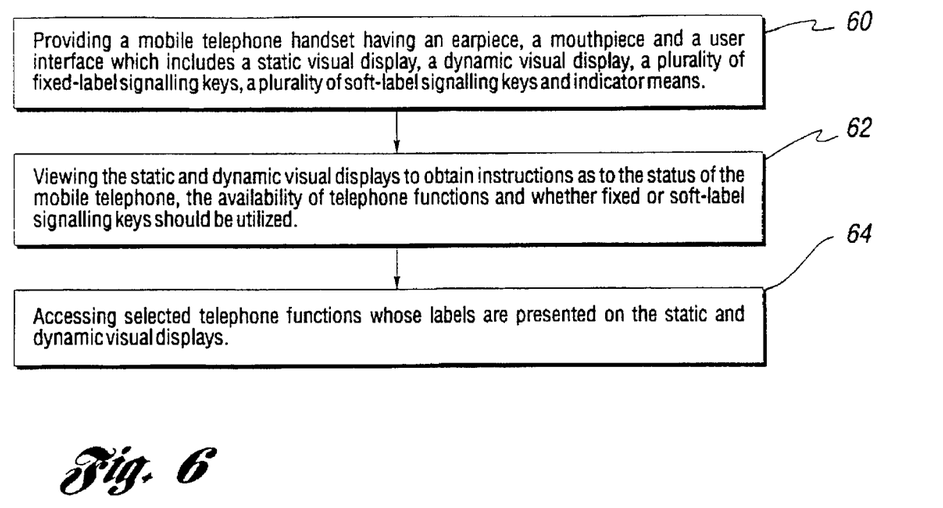
FIG. 6 is a block diagram of the method steps of the present invention.

Referring now to FIG. 4 of the drawings, another prior art hand portable mobile telephone is shown generally designated by reference numeral 50 and known to those skilled in the art as Finnish Nokia Model No. 101 portable telephone. Again, like the prior art handsets 34 and 44, the Nokia 101 also includes a first class of fixed-label entry keys 52 for generating DTMF signals. Handset 50 further includes a second class of fixed-label action keys 54, i.e., <CLR>, <RCL>, <STO>, <SEND>, <END>, <ALPHA>, etc., for initiating selected functions. Again, both the first and second class of fixed-label entry keys are tied to a single visual display 56. Handset 50 further includes a browsing key <↑↓> 58 for use in cooperation with menu key 60.

Referring now to FIG. 5 of the drawings, a mobile telephone handset incorporating the novel user interface of the present invention will now be described in further detail. As shown, the interface of the present invention is incorporated in a portable telephone handset which is generally designated by reference numeral 62. Handset 62 generally comprises an elongated body portion 64, however, applicants recognize that other body portion designs may be adopted depending on the anticipated use. Thus, handset 62 may comprise a flip-top body design or other suitable shape. As seen, in one preferred embodiment, handset 62 includes an earpiece 66 and a mouthpiece 68, disposed at opposite ends of body portion 64. Applicant recognizes, however, that in an alternative embodiment, earpiece 66 and mouthpiece 68 may similarly be disposed on the opposing face of handset 62 (not shown) such as in vehicular uses or for convenience purposes.

Still referring to FIG. 5, handset 62 is shown including a static visual display 70 such as the designations "in use" and "MSG" for presenting the status of the mobile telephone and other services accessible by the user. In the preferred embodiment, indicator means such as a selectively displayed light emitting diode (LED), blinking cursor, icon or other suitable indicator 72 is also provided to indicate the current context of the interface. For example, whether the communication is in progress, whether a message is waiting, etc. Handset 62 further includes at least one and preferably two dynamic visual display means such as Liquid Crystal Displays (LCD) 74 and 76 corresponding to a plurality of context sensitive function labels generally designated by reference numeral 78. As those skilled in the art will recognize, displays 74 and 76 may, of course, be LED or other suitable displays.

As shown in FIG. 5, when handset 62 is first turned on, dynamic visual display 76 presents labels 78, i.e. "LAST", "MEMORY" and "MENU". At the same time, dynamic visual display 74 presents the label "ENTER PHONE #". Prompting means such as a selectively displayed blinking cursor 80 is further provided in electrical communication with dynamic visual display 74 to prompt the user to enter a selected telephone number. As shown in FIG. 5, each of the context sensitive function labels 78 has a corresponding soft-label key 82, 84, 86, 88, 90 and 92 operative to access the displayed function label. Soft label keys 82–92 are, of course, provided in electrical communication with respective static and .dynamic visual displays 70, 74 and 78. Similarly, there is provided a plurality of fixed-label signaling keys 94 which are also provided in electrical communication with both the static and dynamic visual displays for entering telephone numbers and other Dual-Tone Multi-Frequency (DTMF) signals.

As readily seen, the user interface of the present invention which presents only two classes of entry keys reduces the possibility of an invalid key entry by proactively informing the users of what key entries are relevant in the current context. Similarly, the interface reduces the possibility, time and user frustration in error recovery, by reducing the number of keys and displaying semantically precise labels for desired functions.

OPERATION

With reference now to FIGS. 6–11 of the drawings, the operation and method steps of the present invention will be described in further detail. As shown in block 60 of FIG. 6, the interface method of the present invention is adapted for use in a mobile telephone communication network and includes the initial provision of a mobile telephone handset having an earpiece, a mouthpiece and a user interface which includes a static visual display, a dynamic visual display, a plurality of fixed-label signaling keys, a plurality of soft-label signaling keys and prompting means. As further shown in blocks 62 and 64, the present invention further includes the steps of viewing the static and dynamic visual displays to obtain instructions as to the status of the mobile telephone, the availability of telephone functions and whether fixed or soft-label signalling keys should be utilized. Once provided with this information, selected telephone functions whose labels are presented on the static and dynamic visual displays may be accessed.

Figure 7:
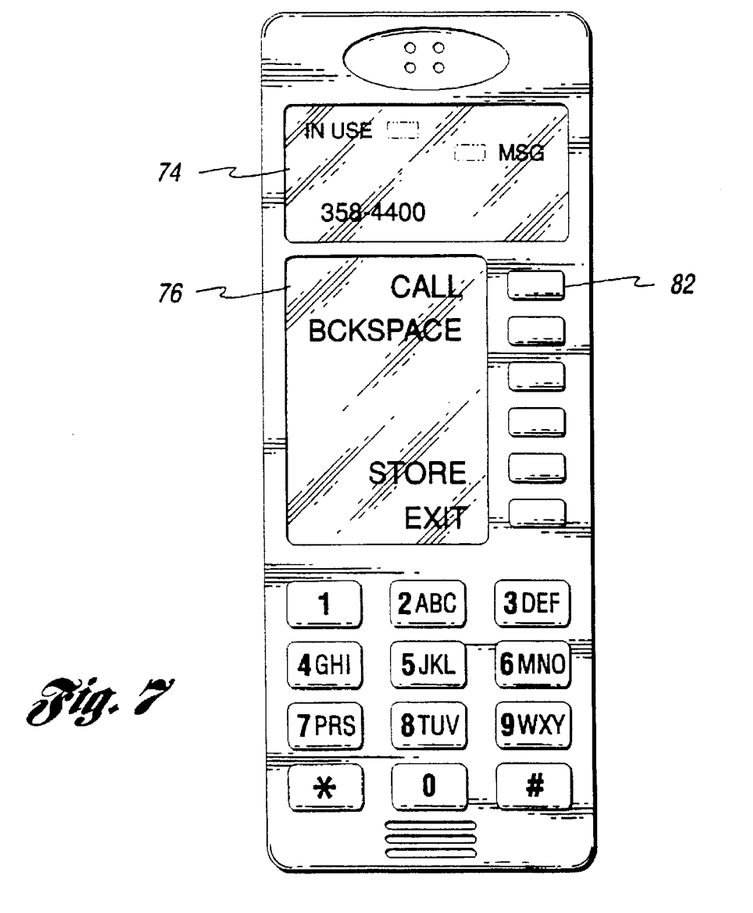
FIGS. 7–13 are detailed schematic diagrams of the user interface of the mobile telephone handset of the present invention.
Figures 8, 9:
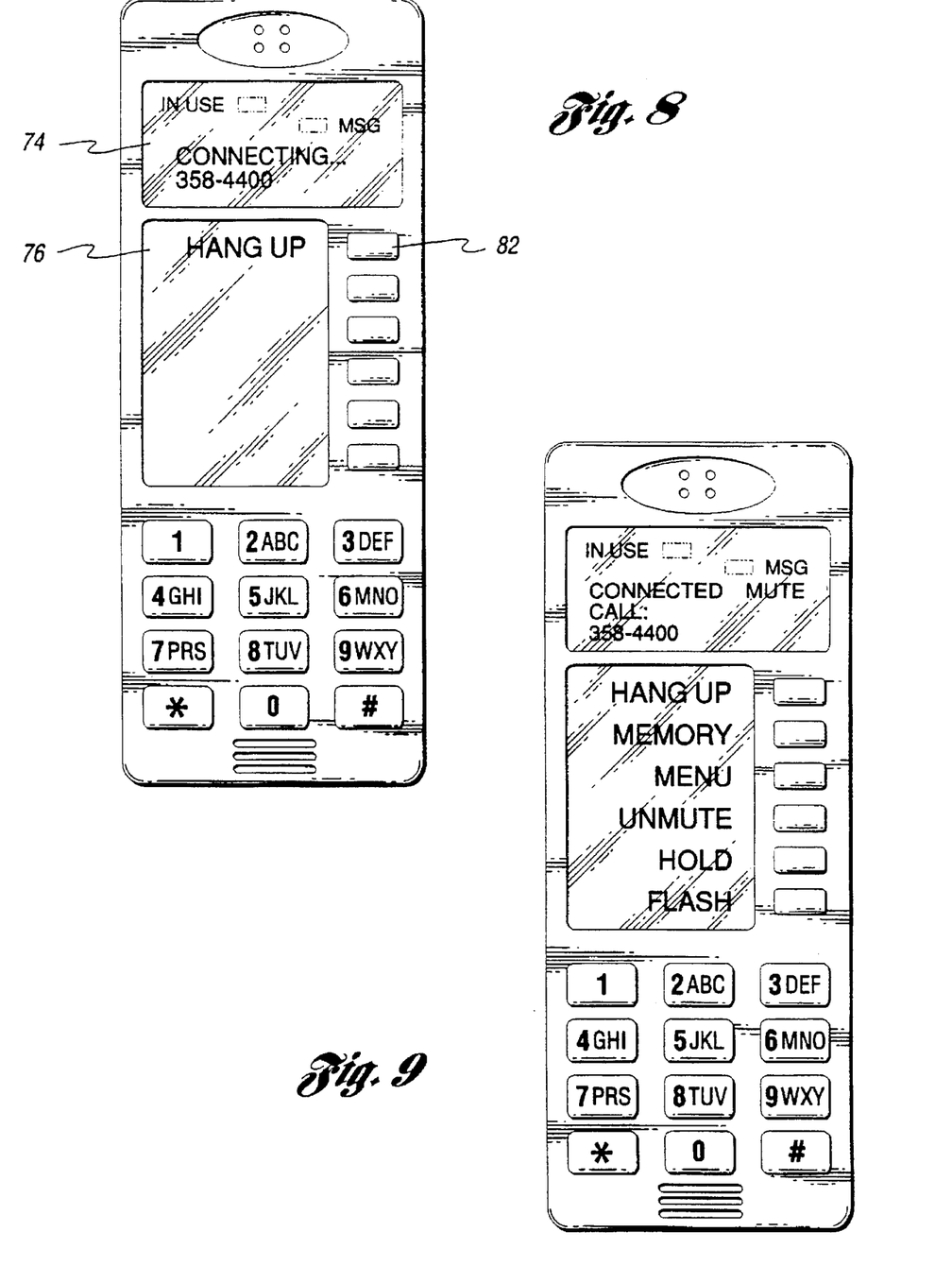
Figures 10, 11:
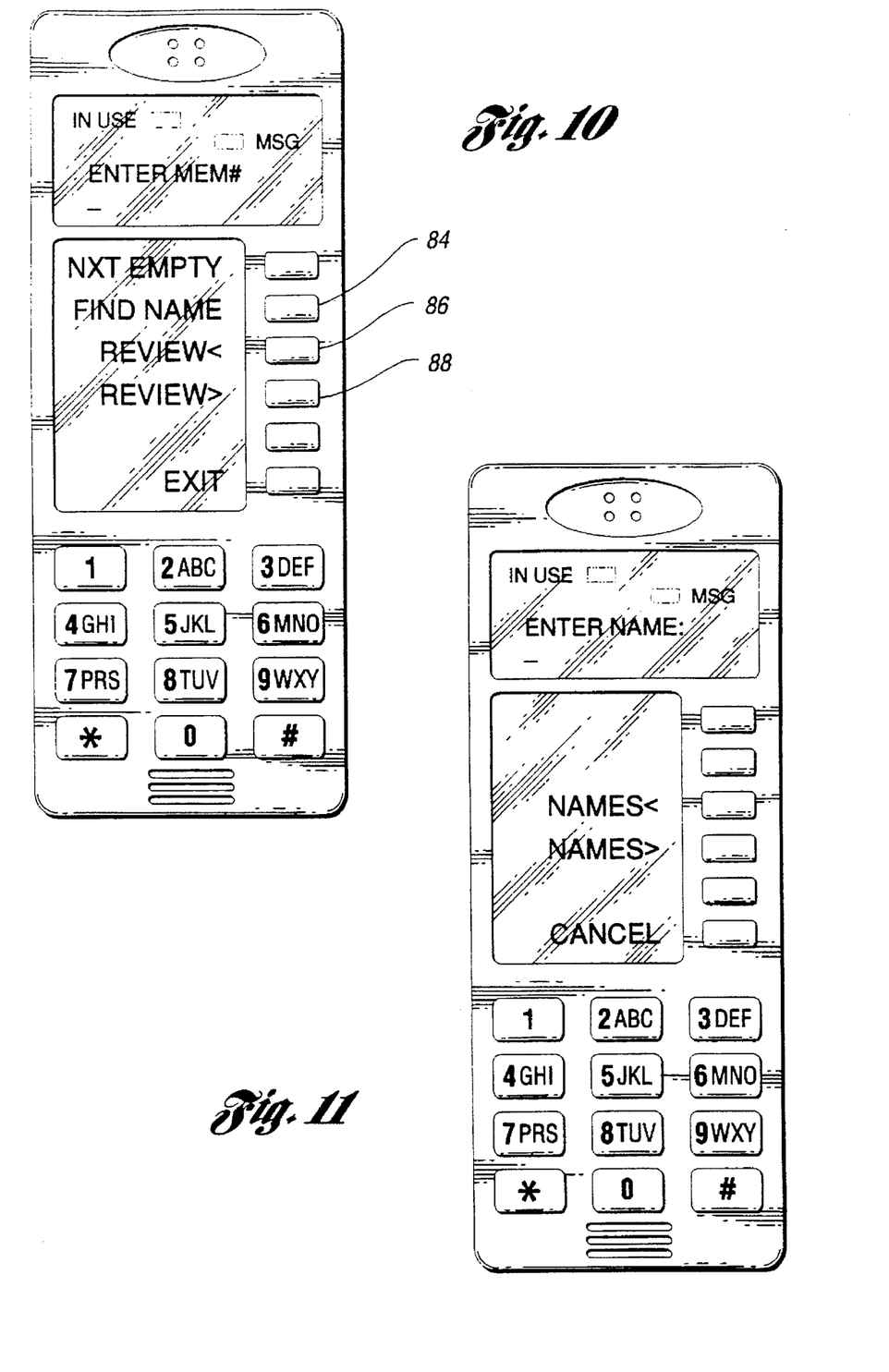

With reference now to FIG. 7, for example, a user desirous of dialing a known telephone number, i.e., 358-4400, may simply enter the number through the use of fixed label (DTMF) signaling keys 94. In one preferred embodiment, during entry of this telephone number, dynamic visual display 74 will present the entered telephone numbers and dynamic visual display 76 will present the labels "call" "bckspace", "store" and "exit". If the telephone number has been properly entered, the user may then push soft label signaling key 82 to transmit the call. As shown in FIG. 8, while the call is being transmitted, an indication to that effect may be provided in dynamic visual display 74 while dynamic visual display 76 may present the label "hang up" in the event the user desires to cancel the call. In such case, the user may again depress soft label signaling key 82 and return to the communication context shown in FIG. 5. In the alternative, if the call proceeds to connection, an indication to that effect may be displayed in dynamic visual display 74 and alternative options, i.e., "hang up", "memory", "menu", "mute", "hold" and "flash" will be provided to the user as soft labels displayed in dynamic visual display 76. In this communication context shown in FIG. 9, it should be noted that no prompting means is provided because fixed-label signaling keys 94 are neither relevant nor appropriate in the present context.

Returning now to FIG. 5, the novel memory functions of the user interface of the present invention will be further described in detail. As shown, once the power is turned on, the user is prompted via blinking cursor 80 to enter a phone number to the use of fixed label signaling keys 94. Alternatively, however, the user may access memory functions of the handset by depressing soft label signaling key 84. In such case, the context of the communication interface will again change as shown in further detail in FIG. 10. Specifically, the user may press soft label signaling keys 86 or 88 to review stored names and information or, in the alternative, may depress soft label signaling key 84 to enter information which may be recognizable by the handset to locate a stored name or number. If the latter option is selected, the communication context may appear initially as shown in FIG. 11 and again change to the context of FIG. 12 once at least one letter of a name has been entered.

Figures 12, 13:
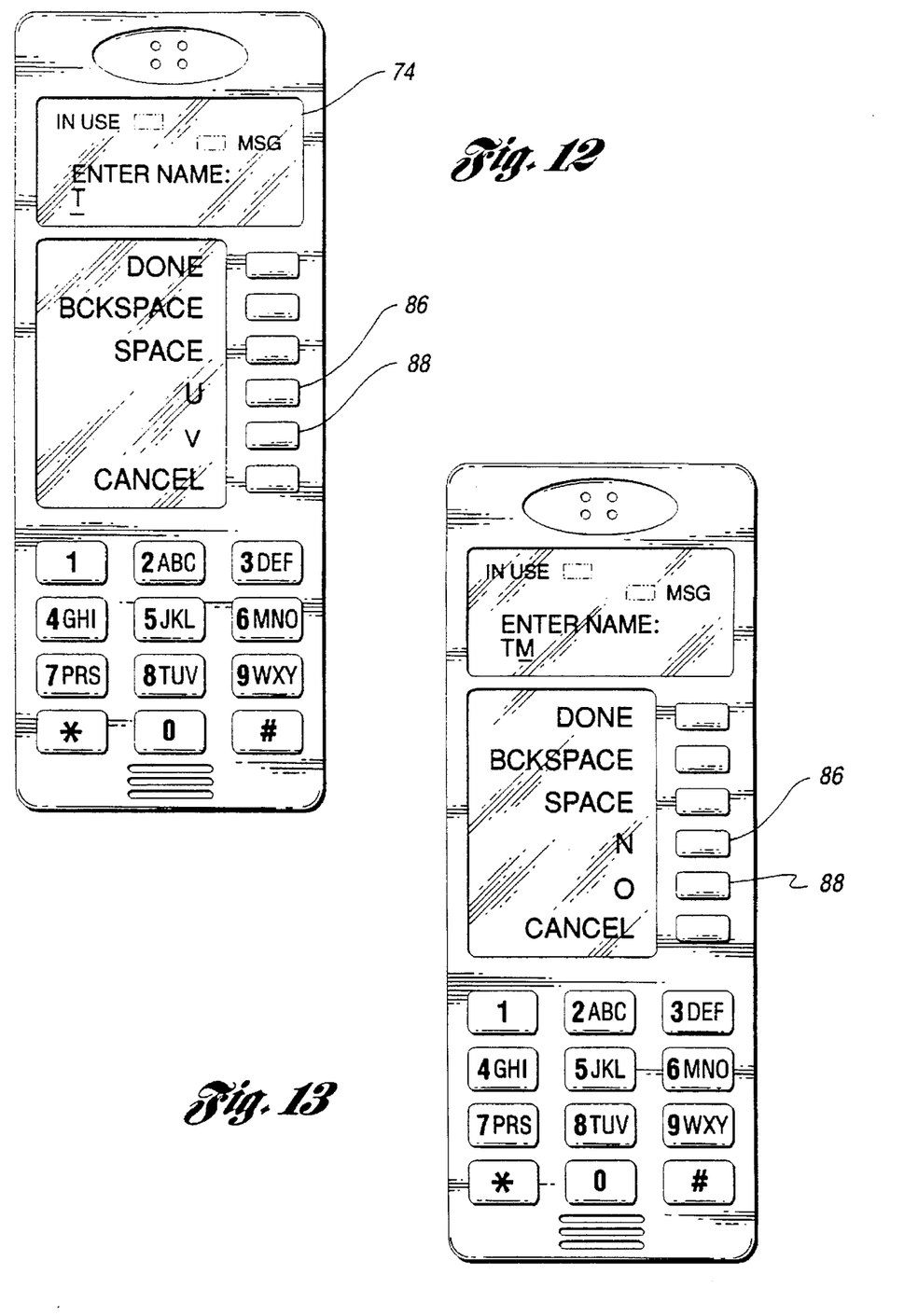

Referring now to FIG. 12, in one preferred embodiment, a user desirous of entering the name Tony may depress the fixed label (DTMF) signaling key identified broadly by the number 8. As those skilled in the art will recognize, however, the letters T, U and V are all accessible by depressing the number 8 and have generally been unrecognizable in prior art telephone interfaces. To overcome this problem, Applicants utilize soft label signaling keys in an effort to distinguish between the corresponding letters. As shown in FIG. 12, for example, once DTMF key 8 has been entered, the letter "T" will appear on dynamic visual display 74 along with a blinking cursor prompting the user to enter a second letter. In the event that a "U" or "V" is more properly desired instead of a "T", the user may simply depress soft label signaling key 86 or 88 to replace the entered letter. In the specific example illustrated, to enter the name "Tony", the user may depress DTMF key 8 followed by DTMF key 6. As shown in FIG. 13, the letter "M" will be provisionally provided in dynamic visual display 74, yet will provide the user the opportunity to correct the entry by depressing soft label signaling keys 86 or 88 to replace the "M" with a "N" or, more properly, a "O". Once sufficient information has been entered, the user may thereafter depress soft label signaling key 84 indicating that the user is "done", and the handset will attempt to locate a stored entry corresponding thereto.

As readily seen, the mobile telephone interface and method of the present invention which incorporates two classes of signaling keys greatly reduces user error by providing explicit instructions to the user for the use of soft labels and soft label signaling keys and a dynamic visual display. While the best modes for carrying out the invention have been described in detail, those familiar in the art to which this invention relates will recognize various alternative designs and embodiments for practicing the invention as defined by the following claims:

What is claimed is:

1. A user interface for use in a mobile telephone handset, comprising:

static visual display means for presenting the status of said mobile telephone and services accessible by said user;

dynamic visual display means for presenting a plurality of context sensitive function labels;

a first and a second class Of keys on one face of said handset;

said first class of keys including a plurality of fixed-label DTMF signaling keys in electrical communication with said static and dynamic visual display means; and said second class of keys including a plurality of soft-label signaling keys in electrical communication with said static and dynamic visual display means such that a corresponding context sensitive function label is displayed adjacent to a corresponding soft label key, said soft-label keys operative to access a function indicated by said corresponding context sensitive function label.

2. A user interface as in claim 1, further comprising prompting means in electrical communication with said dynamic visual display means for indicating to said user whether said fixed-label or said soft-label signaling keys should be used.

3. A user interface as in claim 2, wherein said prompting means comprises a selectively displayed blinking cursor.

4. A user interface as in claim 1, wherein said fixed-label signaling keys comprise Dual Tone Multi-Frequency (DTMF) signaling keys.

5. A user interface for use in a mobile telephone handset, comprising:

static visual display means for presenting the status of said mobile phone and other services accessible by said user;

dynamic visual display means for presenting a plurality of context sensitive function labels;

a plurality of Dual Tone Multi-Frequency (DTMF) signaling keys in electrical communication with said static and dynamic visual display means;

a plurality of soft-label signaling keys in electrical communication with said static and visual display means such that a corresponding context sensitive function label is displayed adjacent to a corresponding soft label key; and prompting means in electrical communication with said dynamic visual display means for indicating to said user whether said DTMF or said soft-label signaling keys should be used, such that said user may access the functions by pressing the indicated key.

6. A user interface as in claim 5, wherein said prompting means comprises a selectively displayed blinking cursor.

7. A mobile telephone handset, comprising:

an earpiece;

a mouthpiece;

static visual display means for presenting the status of said mobile phone and other services accessible by said user;

dynamic visual display means for presenting a plurality of context sensitive function labels;

a plurality of fixed-label DTMF signaling keys in electrical communication with said static and visual display means; and a plurality of soft-label signaling keys in electrical communication with said static and visual display means such that a corresponding function label is displayed adjacent to a corresponding soft label key, said soft-label keys operative to perform the function indicated by said corresponding function label.

8. A mobile telephone handset as in claim 7, further comprising prompting means in electrical communication with said dynamic visual display means for indicating to said user whether said fixed-label or said soft-label signaling keys should be used.

9. A mobile telephone handset as in claim 8, wherein said prompting means comprises a selectively displayed blinking cursor.

10. A mobile telephone handset as in claim 7, wherein said handset has an elongated body portion having a display portion which includes said static and dynamic visual display means and said pluralities of fixed and soft-label signaling keys and a communication portion which includes said earpiece and mouthpiece.

11. A mobile telephone handset as in claim 7, wherein said fixed-label signaling keys comprise Dual Tone Multi-Frequency (DTMF) signaling keys.

12. For use in mobile telephone communications, a method of interfacing a mobile telephone party to a secondary party, comprising the steps of:

providing a mobile telephone handset having an earpiece, a mouthpiece and a user interface which includes a static visual display, a dynamic visual display, a plurality of fixed-label DTMF signaling keys, a plurality of soft-label signaling keys and indicator means, said dynamic visual display means including function labels, each function label displayed adjacent to a corresponding soft label key;

viewing said visual display to obtain instructions as to the status of said mobile telephone, the availability of telephone functions and whether fixed or soft-label signaling keys should be utilized; and accessing selected telephone functions whose labels are presented either on said static display or on said dynamic visual display adjacent to said soft-label signaling keys.

13. For use in a telephone having a primary visual display and a plurality of fixed label DTMF signaling keys each having a corresponding group of designations, a method of entering selected designations in said primary visual display, comprising the steps of:

providing at least one dynamic visual display means for presenting a plurality of context sensitive function labels;

providing a plurality of soft-label signaling keys in electrical communication with said primary visual display and said dynamic visual display means, said soft-label signaling keys operative to individually access the corresponding designations of said groups, said designations represented as soft labels on said dynamic visual display means adjacent to a corresponding soft label signaling key;

depressing a selected fixed-label DTMF signaling key corresponding to said group of said selected designation so as to enter a predetermined designation in said primary visual display with the remainder of said group or designations each displayed adjacent to a corresponding soft label key; and depressing said corresponding soft-label signaling key adjacent to said desired designation so as to replace said predetermined designation on said primary visual display with said selected designation from said dynamic visual display.

14. For use in a mobile telephone having a primary visual display and a plurality of fixed label signaling keys each having a numeric designation and a corresponding group of alphabetic designations, a method of entering selected alphabetic designations in said primary visual display, comprising the steps of:

providing at least one dynamic visual display means for presenting a plurality of context sensitive function labels;

providing a plurality of soft-label signaling keys in electrical communication with said primary visual display and said dynamic visual display means, said soft-label signaling keys operative to individually access the corresponding designations of said alphabetic groups, said designations represented as soft labels on said dynamic visual display means;

depressing a selected fixed-label signaling key corresponding to said group of said selected alphabetic designation so as to enter a predetermined alphabetic designation in said primary visual display; and depressing said soft-label signaling key corresponding to said selected designation so as to replace said entered designation with said selected designation where necessary.

* * * * *